Feb. 14, 1967  JEAN-LOUIS GAVILLET  3,303,910

ANTI-THEFT ARRANGEMENT FOR POWER-DRIVEN VEHICLES

Filed April 14, 1965  2 Sheets-Sheet 1

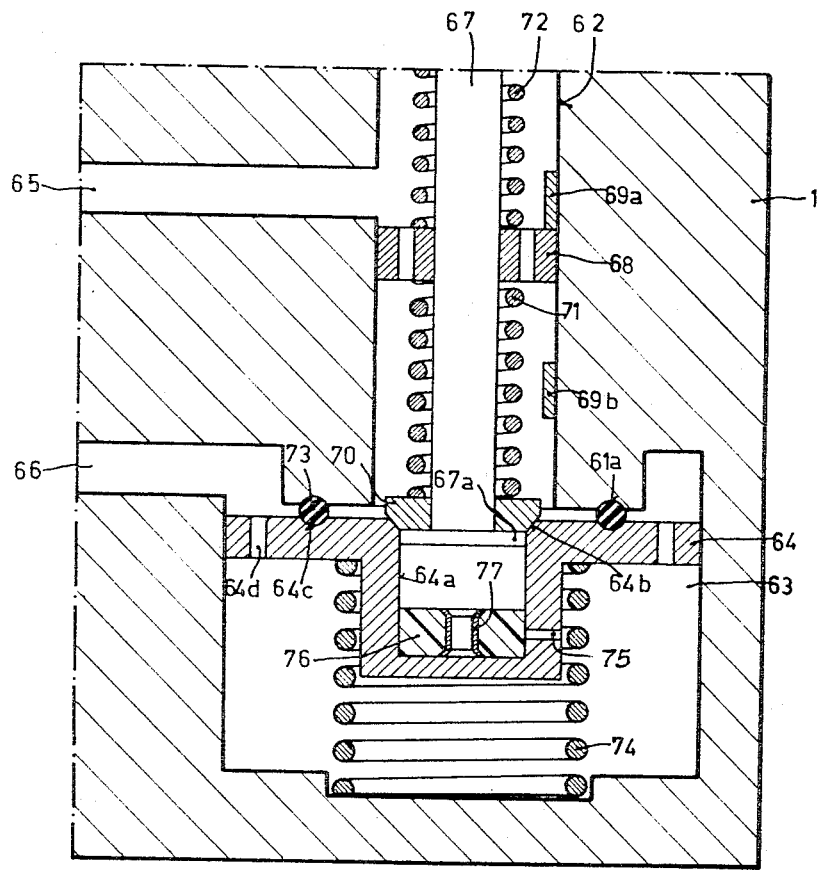

United States Patent Office 3,303,910
Patented Feb. 14, 1967

3,303,910
ANTI-THEFT ARRANGEMENT FOR
POWER-DRIVEN VEHICLES
Jean-Louis Gavillet, 14 Ave. Floreal, Prilly-Vaud-Suisse,
Lausanne, Switzerland
Filed Apr. 14, 1965, Ser. No. 448,036
Claims priority, application Switzerland, Apr. 28, 1964,
5,557/64
1 Claim. (Cl. 188—152)

My invention has for its object an anti-theft arrangement for power-driven vehicles, said arrangement including a valve adapted to be inserted in series in the hydraulic brake-controlling circuit, means for locking said valve and a member controlling said means, the whole arrangement being such that the locking of the valve in its closed position locks the brakes in their operative position.

My improved anti-theft arrangement is characterized by the novel feature consisting in that it includes means connecting the downstream and upstream sections of the hydraulic circuit so as to shunt the valve when the pressure in the downstream section of the circuit rises beyond a predetermined value.

Such a rise in pressure may occur in particular each time the vehicle, equipped with such an anti-theft arrangement, remains for a pretracted time exposed to the sun, which leads to a comparatively large expansion of the mass of oil carried by the hydraulic braking circuit. If the anti-theft arrangement is in its operative position, that is if the connection between the downstream and upstream sections of the hydraulic circuit is cut off, it is then practically impossible, with such an arrangement deprived of the above-disclosed feature, to obtain its release, since the latter can be obtained only by acting on the brake pedal and the pressure obtained thereby is generally much lower than that which may arise under the action of the expansion of the liquid.

Figure 1:
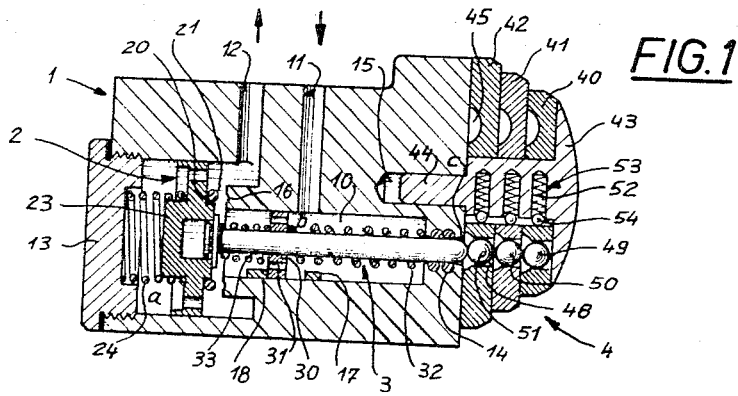
Figure 2:
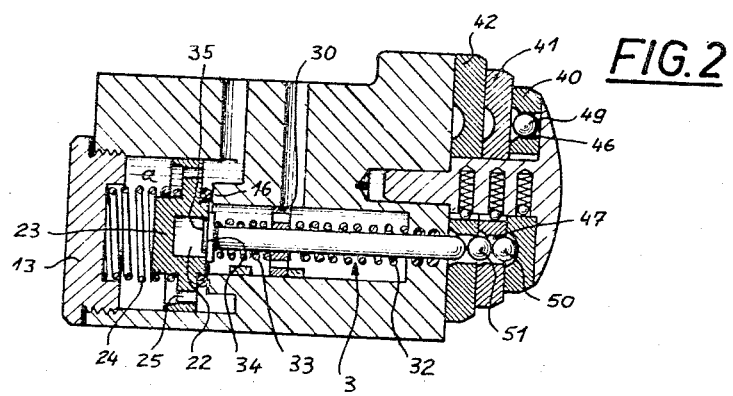
Figure 3:
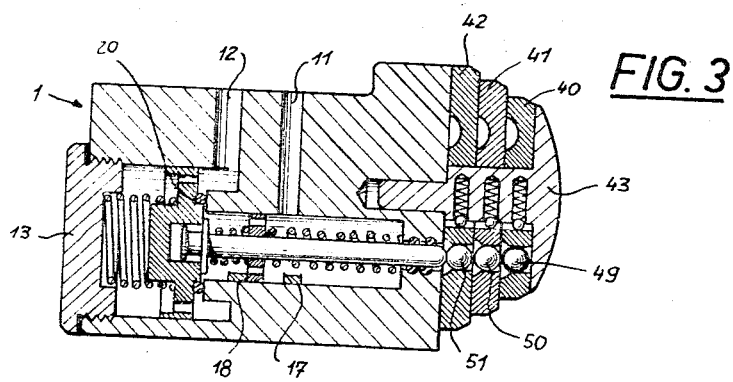

The four figures of the accompanying drawings illustrate a preferred embodiment of my invention. In said drawings:

FIGS. 1, 2 and 3 are cross-sections showing the valve arrangement in its successive operative stages, FIG. 4 is a longitudinal cross-section of a detail of said arrangement, said cross-section showing the novel safety means in the position corresponding to a locking of the vehicle brakes.

As illustrated in FIGS. 1 to 3, my improved anti-theft arrangement includes a frame 1 carrying a valve 2 inserted in series in the hydraulic circuit of the vehicle and the closing and opening of which are produced by a rod 3. A member 4 located at the upper end of the arrangement controls its operation.

The frame 1 encloses an inner cylindrical housing 10 fed by a first pipe 11 connected with the master cylinder controlling the brakes while a second pipe 12 connects said housing with the wheel-braking cylinders. The housing 10 is closed at its lower end by a threaded plug 13 and includes three sections $a$, $b$, $c$ of which the diameters decrease as their distance from the plug 13 increases. The section $c$ is provided with a fluidtight packing 14. The frame 1 is also provided with a blind tapped bore 15 adapted to secure the control member 4 in position.

The valve 2 which is in the shape of a disc, is provided in its upper surface which is shown as facing the right hand side of the drawing, with an annular groove 20 inside which is housed a packing 21 adapted to be urged against a collar 16 formed on the inner wall of the housing 10a in the frame 1, said valve being provided furthermore at its center with a cylindrical recess 22. The lower surface of the valve carries a cylindrical extension 23 round which is fitted a return spring 24 which urges the valve 2 against the collar 16 when the rod 3 allows such a movement. Openings 25 provided in the outer flange of the valve are intended to balance the pressure on either side of the disc-shaped valve when the latter is in its open position.

The rod 3 is guided in the section $b$ of the housing 10 by the plug 30 carried by it and slidingly engaging the housing and it may be shifted inside its housing by a predetermined length defined by the stops 17 and 18 which latter serve as abutments for said plug 30. Said guiding plug is provided with ports 31 which allow the fluid passing out of the pipe 11 to flow into the pipe 12 and it serves as a seat for two springs 33 and 32 facing opposite directions. The spring 33 wound round the lower part of the rod 3 engages through its end opposed to the plug, a movable ring 34 slidingly carried by the rod 3 over a head 35 rigid with said rod. Said ring 34 engages through the periphery of its lower surface, the upper surface of the valve 2. The other spring 32 is wound round the upper part of the rod 3 and engages the end wall of the section $b$ of the housing 10. The upper end of the rod 3 slides inside the section $c$ of the housing 10 and carries a semi-spherical head adapted to engage the control member 4.

Said control member 4 is constituted by three superposed discs 40, 41 and 42 arranged coaxially and revolvably carried by the frame through the agency of a member 43 the expanded head of which is secured to the frame by means of a threaded rod 44 engaging the tapped bore 15. The discs 40, 41 and 42 are provided each in their lower surface with an annular groove 45, said grooves being of equal radii and opening into corresponding cylindrical ports 46. Balls 49, 50 and 51 are inserted in each of said ports or recesses 46. According to a modification, it is of course possible to provide a different number of discs. The angular positions of the discs may be adjusted independently and be defined by means of reference marks provided for this purpose on the edge of each of the discs. The body of the member 43 having an expanded head is provided with three radial cylindrical recesses 52 which are all similar and carry each a spring 53 and a ball 54. Each ball 54 engages a cooperating recess 55 formed along the inner periphery of the corresponding disc 40, 41 or 42 and registering with the corresponding scale so as to produce a number of arresting notches.

When the arrangement described is no longer operative, the balls 49, 50 and 51 cooperating with the discs 40, 41 and 42 are located in superposition and the rod 3 is locked as shown in FIG. 1 The spring 33 produces a thrust which is larger than that exerted by the spring 32 and therefore holds the valve in its open position through the agency of the ring 34 engaged by said spring 33. Any action exerted on the brake pedal produces an increase in the pressure prevailing in the pipe 11, which increase is entirely transmitted through the pipe 12 to the brakes. The release of the same brake pedal leads to a simultaneous lowering of the pressure in both pipes; the operation of the brakes is thus normal.

The anti-theft arrangement described hereinabove is caused to operate through an angular shifting of at least one disc which carries along, as it moves, the corresponding ball; consequently the alignment of the balls is cut out, which alignment is essential for the locking of the rod 3. Assuming that the angularly shifted disc is the disc 41, a fraction of its groove 45 enters a position above the ball 51 carried by the disc 42. Any action exerted on the brake pedal produces a pressure inside the housing 10 and this leads to a shifting of the rod 3 upwardly, that is towards the right hand side of the drawings (FIG. 1 to 3), the fluid pressure acting against the spring 32 on the head 35 of the rod. The rod 3 urges the ball 51 into the groove 47 to the adjacent disc 41 and releases simultaneously the valve 2 which is urged against its seat 16 under the action of the spring 24, whereby the connection between the pipes 11 and 12 is cut off. Upon release of the brakes, the pressure drops only inside the pipe 11 and it is held at its prior pressure inside the pipe 12, the operation of the brakes of the vehicle remaining without any change. The pressure of the fluid exerts its action and cooperates with the thrust exerted by the spring 24, which has a tendency to urge the valve 2 more energetically onto its seat 16.

The anti-theft arrangement is prevented from operating by replacing in aligned superposition the balls of all the discs as provided by an angular return movement of the angularly shifted disc. From this moment onwards (FIG. 3), the rod returns into its original position; its head 35 engages the axial recess 22 in the valve, which latter is still in its closed position, and the spring 33 is compressed between the guiding plug 30 and the ring 34. When the brake pedal is now depressed again, the pressure in the housing section b becomes equal to that prevailing in the housing section a and since the stress produced by the spring 33 is larger than that exerted by the spring 24, the valve 2 opens and returns into its inoperative position. The release of the pedal produces from this moment onwards a simultaneous lowering of the pressure in the pipes 11 and 12, which allows the vehicle to start normally.

Of course, the release of the rod 3 corresponding to the operation of the arrangement, may be obtained through the rotation of any of the discs considered singly or else it may be obtained by shifting several discs into different angular positions.

Turning now to FIG. 4 in which the reference numbers have been changed for sake of clarity and uniformity, 1 designates the body of the arrangement inside which is formed a tubular channel 62 communicating at its inner end with a cylindrical chamber 63 inside which may slide the locking valve 64; the body 1 is provided furthermore with two channels 65 and 66 of which the former 65 is connected with the brake-controlling pedal while the channel 66 is connected with the circuit controlling the jaws of the brake which may be indifferently a drum or disc brake.

Inside the channel 62 may slide a rod 67 of which the upper end cooperates with a locking system which is not illustrated in FIG. 4, but is the same as that illustrated in detail in the preceding FIGURES 1 to 3. Said rod 67 carries in its medial section a sliding plug 68 adapted to move with the rod 67 between two stops 69a and 69b secured to the wall of the channel 62. At its lower end, the rode 67 is provided with a head 67a which is adapted to slide inside a cylindrical bore 64a formed in the valve 64. The rod 67 also slidingly carries a ring 70 urged against a cooperating seat 64b on the valve 64 by a spring 71 engaging the plug 68. 72 designates a compensating spring furthering the downward movement of the rod 67 as described hereinabove.

The valve 64 which is in the shape of a broad-brimmed hat is provided along the upper surface of its brim, with an annular groove 64c forming one of the seats for a fluidtight packing 73 lying, for the closed position of the valve 64, in contacting relationship with a second annular seat 61a provided in the body 1. Through the rim of the valve 64, there extend furthermore ports 64d allowing the oil lying underneath said valve to flow towards the pipe 66 when the valve is shifted downwardly against the spring 74 as described with reference to FIGS. 1 to 3.

When the valve is in its closed position and when the vehicle including the anti-theft arrangement illustrated has been left during a comparatively long time under high temperature conditions, the pressure in the section of the hydraulic circuit, located on the brake side of the valve 4, may rise in a manner sufficient for preventing any further control of the downward movement of said valve, chiefly with a view to starting the vehicle. To remove this drawback, the anti-theft arrangement illustrated includes auxiliary means connecting the brake side and brake pedal sections of the hydraulic circuit when the pressure in the brake side section of said circuit is higher than the sum of the resultant stresses exerted in opposite directions by the springs 71 and 74 and by the pressure which may arise above the auxiliary means 75, chiefly under the action of the control pedal of the brakes. Said auxiliary means are chiefly constituted by a radial port 75 and by an annular plug 76; said plug made of elastic material such for instance as rubber or plastic material, is fitted inside the crown of the hat-shaped structure formed by the valve 64 in registry with the port 75. The central bore of said plug forms an axial passageway inside which is inserted a stiffening socket 77. The plug 76 is radially of a size such that it cannot engage the inside of the crown of the valve 64 unless it is compressed in a manner sufficient for it to be capable of being deformed radially by the pressure of the liquid flowing through the port 75, but only when said pressure reaches the predetermined valve which has been defined hereinabove. In such a case, the liquid may flow in a comparatively easy manner between the inner wall of the valve 64 and the plug 76 which is locally deformed. The plug 76 resumes of course its normal position and shape as soon as the pressure in the brake pedal section of the circuit drops underneath its critical value.

My invention is of course not limited to what has been illustrated or described: it will be understood in particular that the means connecting the brake side and brake pedal side sections of the hydraulic circuit and their positioning could be very different from the example given hereinabove.

What I claim is:

In an anti-theft arrangement for a power-driven vehicle having a hydraulic brake controlling circuit:
 (A) a body having a chamber and an axial channel communicating therewith and channels communicating, respectively, with the brake controlling pedal circuit and with the circuit controlling the jaws of the vehicle brake;
 (B) a locking valve slidingly mounted in said chamber said valve having a cylindrical bore surrounded by a seat, said valve having ports communicating with said channel communicating with the circuit controlling the jaws of the brake and a radial port in said bore;
 (C) an annular elastic plug in said bore of said valve adapted to be elastically deformed by excess pressure of liquid flowing through said radial port from said brake controlling pedal circuit;
 (D) a rod slidingly mounted on said axial channel, said rod being slidingly guided therein by a plug having ports, said rod having at one end thereof a head adapted to slide in said bore of said valve, and a ring;
 (E) oppositely facing springs on said rod on either side of said guide plug, one of said springs urging said ring on said rod against said seat, said other spring urging said rod toward said valve;
 (F) a control member cooperating with said other end of said rod, said control member comprising three superimposed coaxial discs, said discs having annular grooves opening into recesses aligned with said end of the rod and containing balls;

(G) said discs being revolvably carried on said body, a member having three radial cylindrical recesses each carrying a spring and a ball in contact with the inner periphery of the corresponding disc, movement of said rod against said balls as a result of increased fluid pressure resulting from action exerted on the brake pedal urging one of said balls into the groove of the adjacent disc and thereby releasing the valve and shutting off communication between said brake controlling pedal circuits and with said circuits controlling the jaws of said vehicle brake.

References Cited by the Examiner

UNITED STATES PATENTS

| | | | |
|---|---|---|---|
| 1,366,151 | 1/1921 | Astrom | 137—524 |
| 2,285,781 | 6/1942 | Patrick | 188—152 |
| 2,603,951 | 7/1952 | Ross | 137—525 X |
| 3,127,906 | 4/1964 | Balster | 137—525 X |
| 3,153,426 | 10/1964 | Milster | 188—152 |

FOREIGN PATENTS 708,367   4/1931   France.

MILTON BUCHLER, *Primary Examiner.*

G. E. A. HALVOSA, *Assistant Examiner.*